US006889222B1

(12) United States Patent
Zhao

(10) Patent No.: US 6,889,222 B1
(45) Date of Patent: May 3, 2005

(54) METHOD AND AN APPARATUS FOR PROVIDING PERSONALIZED SERVICE

(75) Inventor: Yan Zhao, Repulse Bay (HK)

(73) Assignee: Aspect Communications Corporation, San Jose, CA (US)

( * ) Notice: Subject to any disclaimer, the term of this patent is extended or adjusted under 35 U.S.C. 154(b) by 259 days.

(21) Appl. No.: 09/752,896

(22) Filed: Dec. 26, 2000

(51) Int. Cl.[7] .......................... G06F 17/30; G06F 7/10
(52) U.S. Cl. .............................................. 707/3; 707/10
(58) Field of Search ........................ 707/3, 10; 709/219

(56) References Cited

U.S. PATENT DOCUMENTS

| | | | | |
|---|---|---|---|---|
| 5,923,735 A | * | 7/1999 | Swartz et al. ............. | 379/93.12 |
| 5,956,720 A | * | 9/1999 | Fernandez et al. ............ | 707/10 |
| 6,029,195 A | * | 2/2000 | Herz ........................... | 725/116 |
| 6,055,567 A | * | 4/2000 | Ganesan et al. ............. | 709/219 |
| 6,112,186 A | * | 8/2000 | Bergh et al. .................. | 705/10 |
| 6,179,206 B1 | * | 1/2001 | Matsumori .................. | 235/383 |
| 6,199,099 B1 | * | 3/2001 | Gershman et al. .......... | 709/203 |
| 6,202,062 B1 | * | 3/2001 | Cameron et al. ............. | 707/3 |
| 6,401,085 B1 | * | 6/2002 | Gershman et al. ............ | 707/4 |
| 6,424,979 B1 | * | 7/2002 | Livingston et al. ......... | 715/511 |
| 6,501,832 B1 | * | 12/2002 | Saylor et al. ............ | 379/88.04 |
| 6,694,482 B1 | * | 2/2004 | Arellano et al. ......... | 715/500.1 |
| 2002/0035568 A1 | * | 3/2002 | Benthin et al. ............. | 707/102 |

* cited by examiner

*Primary Examiner*—Safet Metjahic
*Assistant Examiner*—Cindy Nguyen
(74) *Attorney, Agent, or Firm*—Schwegman, Lundberg, Woessner & Kluth, P.A.

(57) ABSTRACT

A system comprising an analysis engine that interacts with a user profile server and a content management system. The user profile server is used to collect and manage data. The content management system manages a plurality of content types for a plurality of service points in real-time. A service point supports a content type.

26 Claims, 10 Drawing Sheets

METHOD AND AN APPARATUS FOR PROVIDING PERSONALIZED SERVICE

BACKGROUND OF THE INVENTION

1. Field of the Invention

The invention relates generally to a method and apparatus for providing personalized information and services to individuals from a customer contact center.

2. Background

Businesses are able to offer goods and services to customers located world-wide through networks such as the Internet. As people become increasingly at ease with purchasing goods and services over the Internet, businesses have been able to expand and flourish. Customers are generally interested in quickly perusing the goods and services offered by a business operating on the Internet. Businesses that offer personalized service to customers have a competitive edge over other businesses because customers will generally be serviced more quickly and will be provided with higher quality of service.

Although there are a number of existing products that enable businesses to develop web sites that are able to provide personalized services to their customers, the levels of capability for a personalized service are different. Instead of creating a real integrated solution for personalized service, most existing personalization features are typically built around or tied together some original singularly designed solutions. For example, Net Perceptions offers a series of products that are built around its collaborative filtering technology. Net Perceptions applies this technology to a community behavior analysis based recommendation engine, a knowledge management system, and a campaign management system thereby providing one type of personalization service that may be used in an E-commerce system and a customer call center. However, the users of Net Perceptions system must integrate it with other content management systems to target pre-determined content based upon the recommendations that are generated. One disadvantage to Net Perceptions system is that it is unable to provide different service levels for content targeting. Additionally, the content flexibility and the variation of the content really depend on the external content management system. The knowledge management system provided by Net Perception cannot perform the function of a content management system.

A DYNAMO™ personalization service server by the Art Technology Group (ATG) offers another type of personalized service. The DYNAMO™ personalization server is adapted to manage both static and dynamic user attributes. This provides service content personalization while the customer is being served by a business on the Internet. To generate dynamic user attributes, ATG's DYNAMO™ personalization server uses a statistics based analysis mechanism. The analysis mechanism uses information collected while a user navigates the Internet. One disadvantage to ATG's DYNAMO™ personalization server is that the services are not differentiated for different service points (e.g., for web, voice, Email, system internal usage, etc.) Although DYNAMO™ personalization server enables service rules (e.g., rules that indicate which groups of service content should be provided to which groups of customers), these service rules are unable to differentiate the content for one customer at different service points. One reason is that ATG's DYNAMO™ personalization server depends upon an external content management system to provide service content.

Interact from Responsys.com is an e-mail-based outbound campaign service system that may support multi-media content. However, Interact is limited to a single service channel, i.e., Email, which does not support different content types for different service channels.

E.Piphany is yet another company that offers a personalized service product. E.Piphany's product provides real-time personalization service for customer call centers. The product may be used to define and deliver real-time marketing campaigns (e.g., advertising) through multiple customer touch points such as the phone, the web, an e-mail system, and facsimile. E.Piphany's product uses real-time analysis mechanisms that include a specialized real-time data mining techniques, collaborative filtering, and likelihood analysis. However, the product's personalization process, e.g., for campaigns and for recommendations, relates solely to different customer direct contact points after a customer contact point has been established. It does not contribute to the contact point selection and other system processes. Additionally, the product is not integrated with customer intrinsic information-based personalization service. Moreover, the product is not integrated with a content management system to differentiate different content types to different service points. It is therefore desirable to have a system that addresses the shortcomings associated with conventional systems.

SUMMARY

A system is disclosed that comprises a user profile server, an analysis engine, a content management system, and their interaction to provide personalized services or other like services. The user profile server is used to collect and manage user data. The content management system is used to manage a plurality of content types for a plurality of service points. The analysis and content services are performed in real-time. The system differentiates content types for different service points. Additional features, embodiments, and benefits will be evident in view of the figures and detailed description presented herein.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

One embodiment of the invention relates to an analysis engine coupled to a user profile server and a content management system. Data is transferred from multiple user data collection points to the analysis engine. Personalized services are driven by analysis results dynamically coupled with user information and service content. This allows businesses using this system to offer a customer an improved integrated solution.

Another embodiment of the invention relates to a content management system that is configured to manage a plurality of content types for the same logic item. Examples of content types include the suitable content types for a customer client, an agent client, an interactive voice response system client, and an e-mail client. The content management system provides a content item that is personalized to the receiving party. The receiving party may receive a first content type at the first service point and receive a second content type at the second service point, even though both content types are for the same logic item. One illustration of this embodiment relates to an agent trying to sell a good or service to a customer. While the customer may wish to view the good or service in great detail, an agent typically only requires brief information regarding the good or service since the agent is presumably familiar with the goods or services he is trying to sell. Therefore, the content type for agent assistance is different from the content type for customer self-service.

Specific embodiments are set forth to provide a thorough understanding of the present invention. However, it will be understood by one skilled in the art that the invention may be practiced without these details. Moreover, well known elements, devices, process steps and the like are not set forth in detail in order to avoid obscuring the present invention. Additionally, although the figures present the personalization subsystem, multiple user data collection points, and the multiple service points as separate units, it will be appreciated that the personalization subsystem and multiple service points may be a single unit having any configuration that achieves a similar or the same result.

Figure 1:
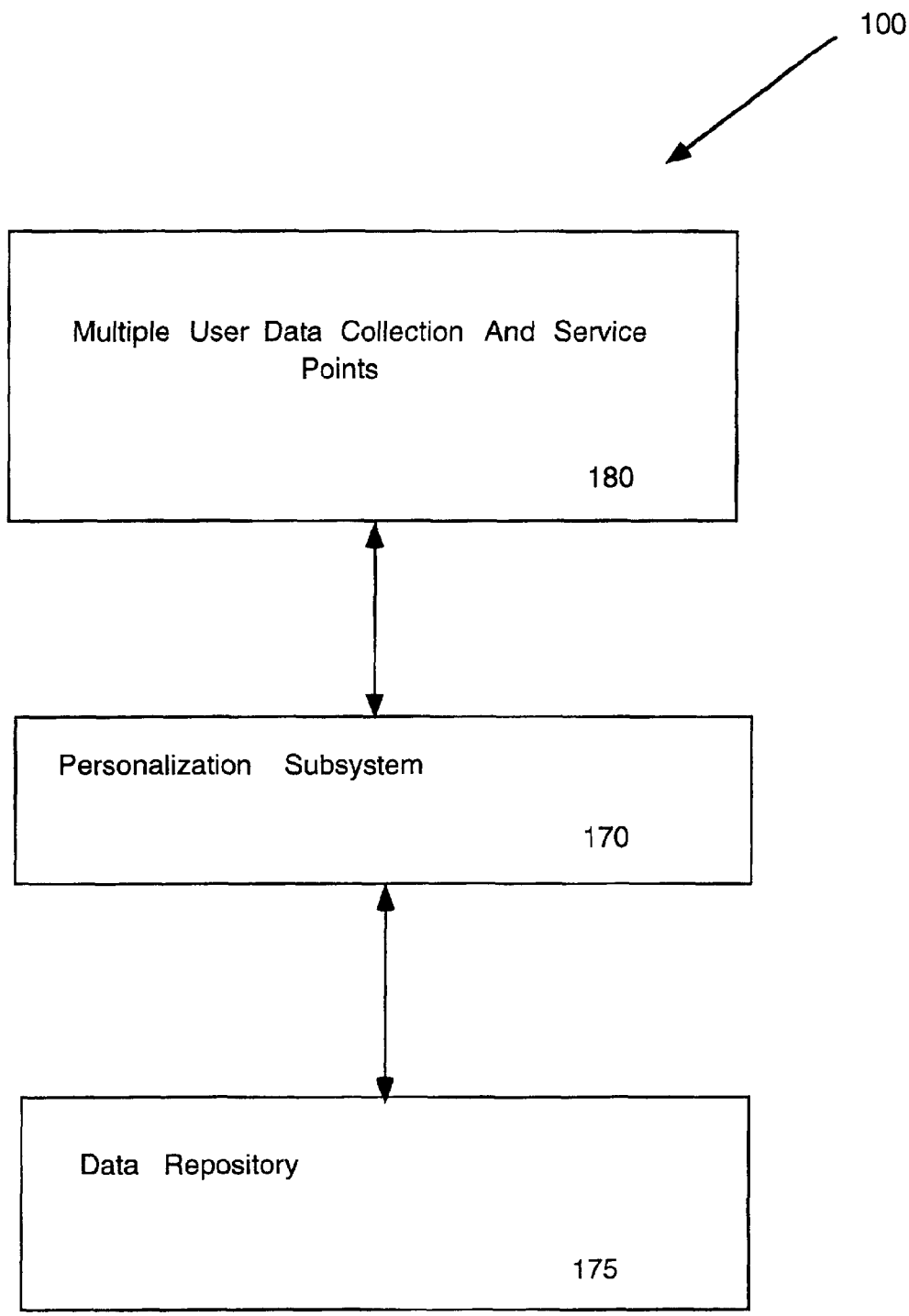
FIG. 1 is a system block diagram illustrating components of the system in accordance with one embodiment of the invention.
Figure 2:
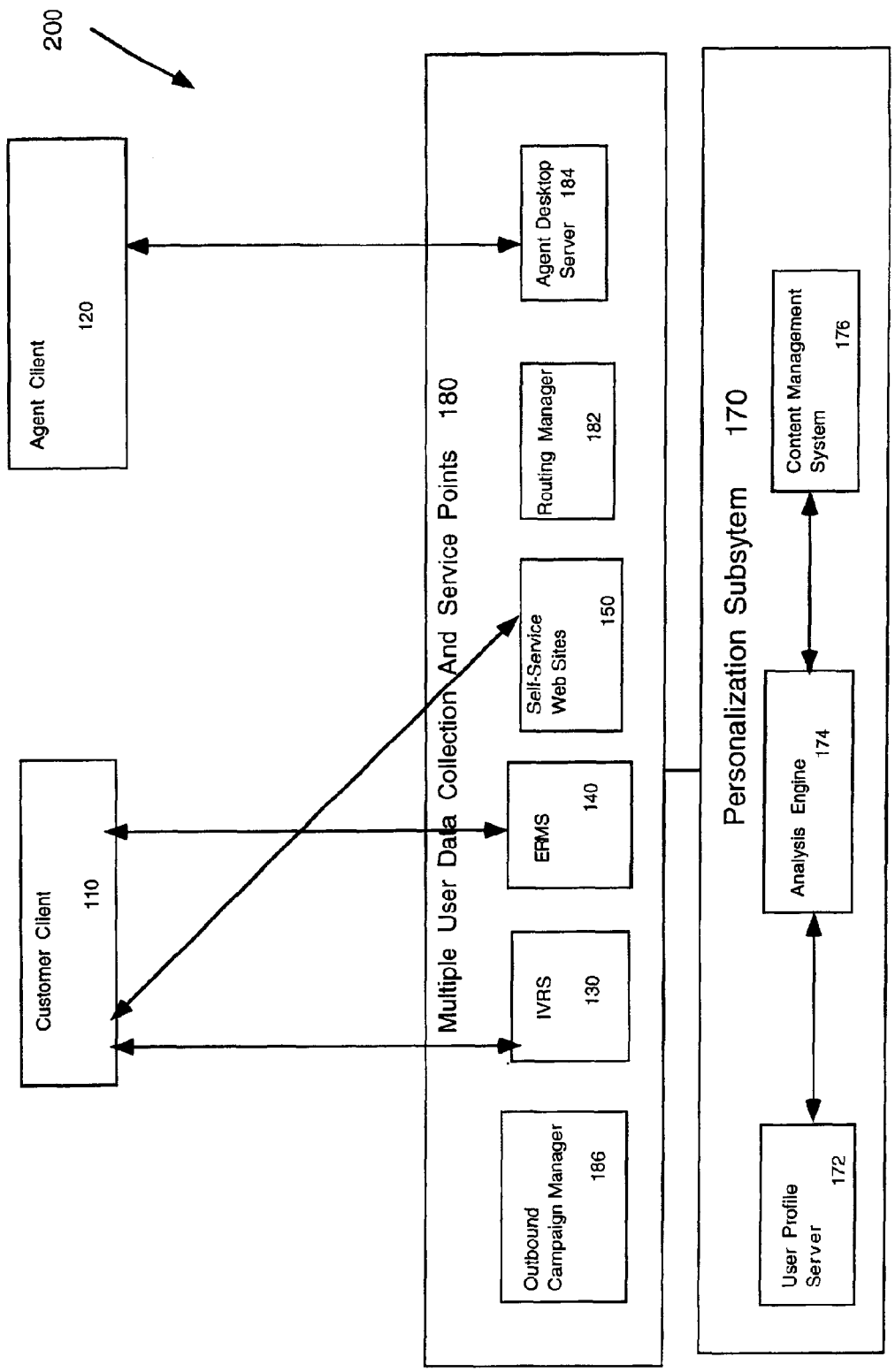
FIG. 2 illustrates a personalization subsystem and multiple user data collection components and service points in accordance with one embodiment of the invention.

FIGS. 1–2 illustrate several embodiments of the invention related to the overall system. FIG. 1 illustrates a system block diagram in accordance with one embodiment of the invention. FIG. 1 shows system 100 that includes multiple user data collection and service points 180 connected to personalization subsystem 170. Data collection points are where data is transferred from, and may include clients, servers, or peers. Data service points are where data is transferred to and may include clients, servers, or peers. Personalization subsystem 170 provides personal information and a personalized service that is capable of supporting multimedia content to multi-channels and multiple service points. To accomplish these tasks, personalization subsystem 170 performs analysis of data, generates recommendations, and transfers recommendations to various clients.

Data repository 175 is also coupled to personalization subsystem 170. Data repository 175 may include different types of data repositories such as a database or any other storage device or memory.

It will be appreciated that system 100 may or may not include a network. A network includes local area networks (LANS), wide area networks (WANS), global networks such as the Internet, networking of telecommunications devices (e.g., cellular networks, PCS networks, wireline telephony networks, and the like.

FIG. 2 illustrates a system block diagram in accordance with the embodiment of the invention in which a network may or may not be used between components. System 200 comprises multiple user data collection and service points 180 coupled to personalization subsystem 170. Multiple user data collection and service points 180 may interface with customer-client 110 and agent client 120.

It will be appreciated that techniques of the invention may be implemented using a network in a variety of configurations such as the network being used by customer-client 110 and agent client 120 to communicate to the servers in data collection and service points. Additionally, the network may be used among components in multiple user data collection and service points 180. In another embodiment, the network may be used to connect components in personalization subsystem 170 from data collection and service points in 180. The network may be connected to the components described herein in any other suitable configuration as well.

While some of these components are not new, it will be appreciated that the components in combination provide a novel way in which to achieve an improved integrated solution. Each of these components is described below. Since the discussion of the components such as data collection and service points 180 is relatively brief compared to personalization subsystem 170, these components are discussed first followed by a discussion of personalization subsystem 170.

Clients

Customer-client 110 is an application that runs on a computer or workstation. Customer-client 110 enables a customer to send and receive data from components such as self-service web site, Email Response Management System ("ERMS"), interactive voice response system ("IVRS") included in multiple data collection and self service points 180.

Agent client 120 is an application that runs on a computer or workstation. Agent client 120 sends and receives data from an agent desktop service component 184. It will be appreciated that other clients may be added to system 200.

Data Collection and Service Points

Data collection and service points include agent desktop server 184, IVRS 130, ERMS 140, self-service web sites 150, routing manager 182, outbound campaign manager 186, and agent desktop server 184. Agent desktop server 184, as a data collection point, may input customer data to both the user profile server 172 and to analysis engine 174. Agent desktop server 184 may also contribute service content to the content management system 176. As a service point, agent desktop server 184 may use personalization subsystem 170 to retrieve content for agent assistance or for direct presentation to a customer.

IVRS 130 is a server or an application that runs on a computer or workstation. IVRS 130 collects customer's requests. IVRS 130 may automatically play an audio response to a customer.

ERMS 140 is a server or an application that runs on a computer or workstation. ERMS 140 enables a person to send and receive e-mail to or from a customer contact center (not shown).

Self-service web sites 150 are web sites provided by a customer contact center to its potential customers that may provide automatic service without involvement of an agent.

FIG. 2 also illustrates other service points such as routing manager 182, and outbound campaign manager 186. Routing manager 182 is connected to user profile server 172, analysis engine 174, and content management system 176. Routing manager 182 receives requests from customer-client 110, for example, such as requests related to a certain product or service. Based upon the request made by a customer, routing manager 182 invokes analysis engine 174 and gets recommendations. Additionally, routing manager 182 may perform calculations and may search data repository 175 for the customer profile and/or the agent profile. Routing manager 182 then matches an agent who is suitable for the customer's requirements and is skilled in the area in which the request is being made and the agent's availability during real-time. The request is then routed to that agent from routing manager 182.

Outbound campaign manager 186 is connected to user profile server 172, analysis engine 174, and content management system 176. Outbound campaign manager 186 provides a multimedia and multi-channel outbound campaign service. Outbound campaign manager 186 also provides service based upon recommendations. It also targets a campaign service content to be sent to a user based upon a user profile information through the operational database (not shown) or the data repository. For example, outbound campaign manager 186 may provide content to a customer that contains visual and audio information through e-mail, and/or audio into a telephone channel. The multimedia campaign content is managed in content management system 176 and is retrievable by outbound campaign manager 186. Outbound campaign manager 186 may be automatically triggered by analysis engine 174 causing outbound campaign manager 186 to retrieve campaign content from the content management system 176. Outbound campaign manager 186 then sends campaign content to customer-client 110 through an appropriate customer contact channel. Customer contact channels for a customer include an e-mail address(es), a phone number(s), a mailing address(es), or other suitable channels. It will be appreciated that outbound campaign manager 186 is configured to retrieve the campaign content item in a different media type and different format from content management system 176 for different customer contact channels. User profile server 172 provides campaign target information (i.e., to whom the different campaign content should be sent).

Another component of data collection and service points 180 is agent desktop server 184. Agent desktop server 184 is a server connected to user profile server 172, analysis engine 174, and content management system 176. Agent desktop server 184 provides information and services to agent client 120, e.g., customer info as to the optimal product or service to be provided to a customer, multimedia applications for customer contact, etc. It also provides recommendation to agent based upon data generated from analysis engine 174 in association with content management system 176.

Personalization Subsystem

FIG. 2 further illustrates in detail personalization subsystem 170. Personalization subsystem 170 includes user profile server 172, analysis engine 174, and content management system 176. Each of these components are discussed below.

User profile server 172 collects, manages, and provides service of user profile data, user credential data, and other relevant data to various components such as to the routing manager 182, agent desktop server 184, outbound campaign manager 186, as well as to analysis engine 174. These components may then act upon this data.

User profile data includes both static and dynamic user attributes. Static attributes are attributes that have been stored in a data repository 175 persistently. Static attributes relate to relevant prolonged user information such as a user's name, address, phone number, e-mail, occupation, or other suitable information. In contrast, a dynamic attribute is an attribute that is inputted by an agent and generated by analysis engine 174 in real-time during service or other like method of generating dynamic attributes.

Profile data may be inputted from various sources such as through customer-client 110 or transferred from other servers. Additionally, an agent client 120 may input profile data for a particular customer. Data is stored in a data repository. User profile server 172 may have a data repository that is used solely by the user profile server 172 or, alternatively, user profile server 172 may use a common data repository shared with other systems.

User profile server 172 may also facilitate user authentication from clients such as web-based clients by associating a web server authentication mechanism with user credential data maintained in one data repository or a plurality of data repositories. Access is denied to clients in which a user fails user authentication.

Figure 3:
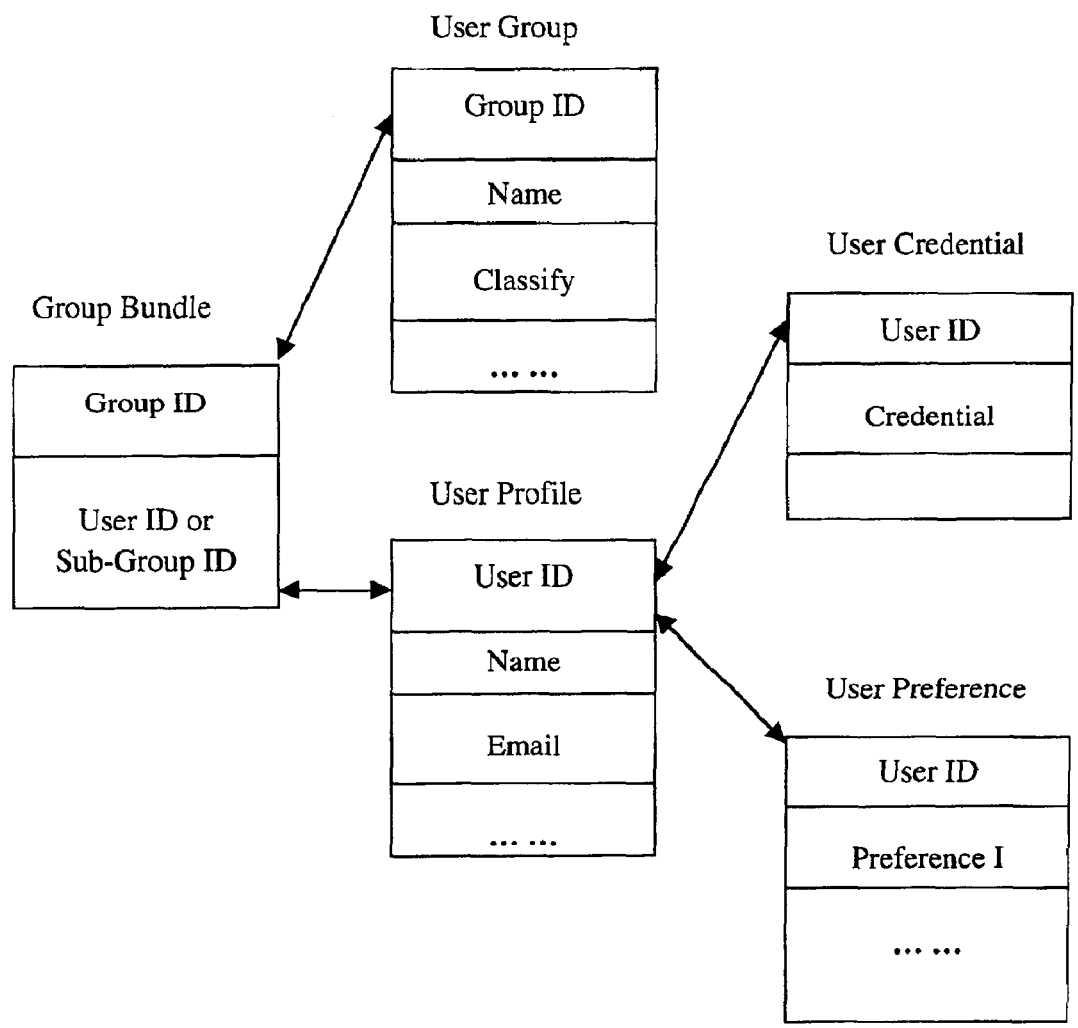
FIG. 3 illustrates organization of data in the user profile server in accordance with one embodiment of the invention.

In order to perform some of the tasks mentioned above, user profile server 172 may organize data in a variety of ways. FIG. 3 illustrates one way of organizing data in the user profile server 172. For example, users are bundled into groups. Group bundle includes a group ID, a user ID or a sub-group ID. Group bundle classifies user according to a variety of criteria.

A user group may include the group ID, the name of the group, the classification of the group, and other relevant information. User profile, on the other hand, may include the user ID, the name of the user, e-mail, and other data. User credential information includes the user ID, password, and other credential information such as a credit card or other means of payment. Other applicable information may be included in the user credential information such as the card user's mother's maiden name. This information may be used to ensure that a third party is not illegally using the credit card of the user. User profile information is associated with the user credential information and the user preference information. The user credential and the user preference may be stored separately from the user profile data to maximize the storage efficiency, data update flexibility, as well as provide convenience for information protection and retrieval.

Analysis Engine

Analysis engine 174 may be a server that has program instructions or it may be program instructions (e.g., computer programs, software, etc.) on a shared server. Analysis engine 174 may use an application program interface in order to accept input for an analysis and to generate a result or a recommendation. The application program interface allows different analysis mechanisms to be plugged in for adapting to new technological advancements such as a new version of program instructions (e.g., computer programs, software, etc.).

Analysis engine 174 performs analysis based upon data provided to analysis engine 174. The generated result combined with service content data may be sent to the data collection and service points 180 such as routing manager 182, agent desktop server 184, and outbound campaign manager 186.

To illustrate the manner in which analysis engine 174 operates, an example of a customer seeking to purchase a sports car is presented below. A customer requests agent assistance by inputting request data from the customer self-service web site 150. The data, contained in a customer request information object, is transferred from customer self-service site 150 to routing manager 182 to find an appropriate agent. Routing manager 182 contacts personalization subsystem 170 for personal attributes and service recommendation retrieving. The personal attributes may be retrieved from the user profile server 172, which may be combined with user request data as an input to analysis engine 174. The user request data may include personal attributes, desire to spend money, the date of delivery of the sports car, the types of sports cars he would consider acceptable. Analysis engine 174 performs computations which may include both statistical and analytical computations based upon the data collected and newly inputted. Analysis engine 174 produces a result in the form of a recommendation metadata object that is associated with content in content management system 176 for retrieving a result. Routing manager 182 may access the result by requesting the result from content management system 176. Alternatively, analysis engine 174 may retrieve results from the content management system 176 and send the result directly to routing manager 182. The recommendation metadata object has information pertaining to the user, user group, content, content category, and content access control. For a recommendation to be made based upon a certain content category, the access control may be applied to the user group for different items in the category for different group of users. The result contained in the recommendation metadata object may include the content ID, the customer's user ID, and the service point ID, which are needed for content retrieval from content management system 176.

The appropriate item attributes may then be retrieved from the content management system 176 by using, for instance, the item ID. Routing manager 182 compares the recommended service data that was obtained from the content management system 176 to the data that pertains to agents that have relevant skills to the good or service that a customer desires. The information regarding the skills and experience of various agents is maintained in data repository 175 or a separate data repository. Routing manager 182 then determines the agent that best matches the customer's requirements. An agent that best matches a customer's request regarding a good or service may be based upon a variety of factors. For instance, an application system may be customized to consider the agent's area of specialization, the amount of time the agent has specialized in that particular area, the gender or age of the agent, or any other factors that the application customizer (e.g., system designer, user, etc.) may deem relevant. In this scenario, the best agent would be a person who specializes in selling recommended sports cars. By matching the most qualified agent to a customer, techniques described herein are able to provide personalized services by increasing the quality of service delivered and potentially reducing the amount of time to perform a transaction between an agent and a customer.

In another embodiment of the invention, the information presented on the graphic user interface ("GUI") to the agent generally contains information relating to the same topic as that which is presented on the GUI to the customer. However, the information on the agent's GUI contains less details than that which is presented to a customer. Each service point such as routing manager 182, outbound campaign manager 186, or agent desktop server 184, may retrieve the recommendation contained in the recommendation metadata object from the content management system 176 by using a unique content ID and service point ID. The content ID is the same for all types of service points. However, depending upon the service point ID, different content may be retrieved. For example, agent desktop server 184 may retrieve a first content type for an agent, and a second content type for customer browser. For example, the type of content that is retrieved and provided to an agent through agent desktop server 184 should be in a format that the agent is able to comprehend but the content does not need to go into as much detail such as extensive marketing information as if the content was being sent to a new customer. This is due to the fact that agents are generally assumed to have knowledge about the services or products that are being provided by the company.

After an agent is selected, the agent receives a request from the customer. The agent may then search for information that is responsive to the customer's request. To provide information such as information regarding a good to a customer, different customer contact channels may be used. Different customer contact channels are configured for different service points such as e-mail addresses, phone numbers, mailing addresses, or other suitable channels to retrieve different content types. A first customer service point and a second customer service point are configured to retrieve different types of content from content management system 176.

The communication protocol is open among a customer, routing manager 182, components in personalization subsystems, and agent desktop server 184. In order to implement techniques described herein, interface objects may be used. In one embodiment, interface objects for analysis engine 174 include recommendation engine, and recommendation service. RecommendationEngine is an object that contains attributes and methods for recommendation engine definition and services. It may be a plug-in from existing products or technologies which is beyond the scope of this invention.

RecommendationService is an interface object that provides recommendation services with appropriate content being retrieved from content management system 176. The service methods may include:

GetResultsForAgent(ContentItemID)
GetResultsForCustomer(ContentItemID)
GetResultsForCustomerInVoice(ContentItemID)
GetResultsForCustomerInFax(ContentItemID)
GetResultsForService(ContentItemID).

Other suitable service methods may also be used.

Content Management System

While analysis engine 174 performs analysis on the data sent to analysis engine 174, content management system 176 manages various kinds of content or content data for personalized customer services including content for agents to assist customers, content for customer service recommendations, and content for customer self-service web sites 150, and content for outbound campaigns.

Content management system 176 may be operated under an independent web server, a shared web server, or a server with other communication protocol. Content management system 176 is capable of searching and retrieving items such as content metadata and content data for other components such as analysis engine 174. Content metadata and the multimedia content data may be stored in data repository 175 or multiple data repositories.

Content management system 176 may be configured to support web browser based clients with search and category navigation interfaces that may be used by a customer and/or agent client 120 for navigation via the Internet. Content management system 176 also provides request/response application program interfaces ("APIs") for service requests from other service components, such as from analysis engine 174 and outbound campaign manager 186.

Content management system 176 may contribute to agent script on the agent desktop. Based upon agent identification and profile, an agent script may be automatically generated after an agent is logged in. The agent may update his/her script during customer service. Additionally, each agent may contribute to data repository 175 by submitting new content to content management system 176.

Content may be requested by customer-client 110, IVRS 130, ERMS 140, or other data collection and service points 180. To illustrate, agent client 120 may determine that a certain content may be useful to a customer. Agent client 120 may then input the agent ID and/or the customer ID. Agent client 120 may input a content ID, explicitly or implicitly by using a content retrieval GUI. Each content ID uniquely identifies a content item described by a metadata object.

For outbound campaign manager 186, content management system 176 provides multimedia campaign content. It is possible to share campaign content with the recommendation content as "the content for customers". However, each content item should have multiple presentation formats for different customer contact channels and for different type of applications.

Service target control data, such as the one to specify which customer or customer group will get what content or services, may be stored in a data repository such as data repository 175. For ease of operation, the metadata for content management system 176 is also stored in data repository 175 although the content data may be distributed in different data repositories.

Figure 4:
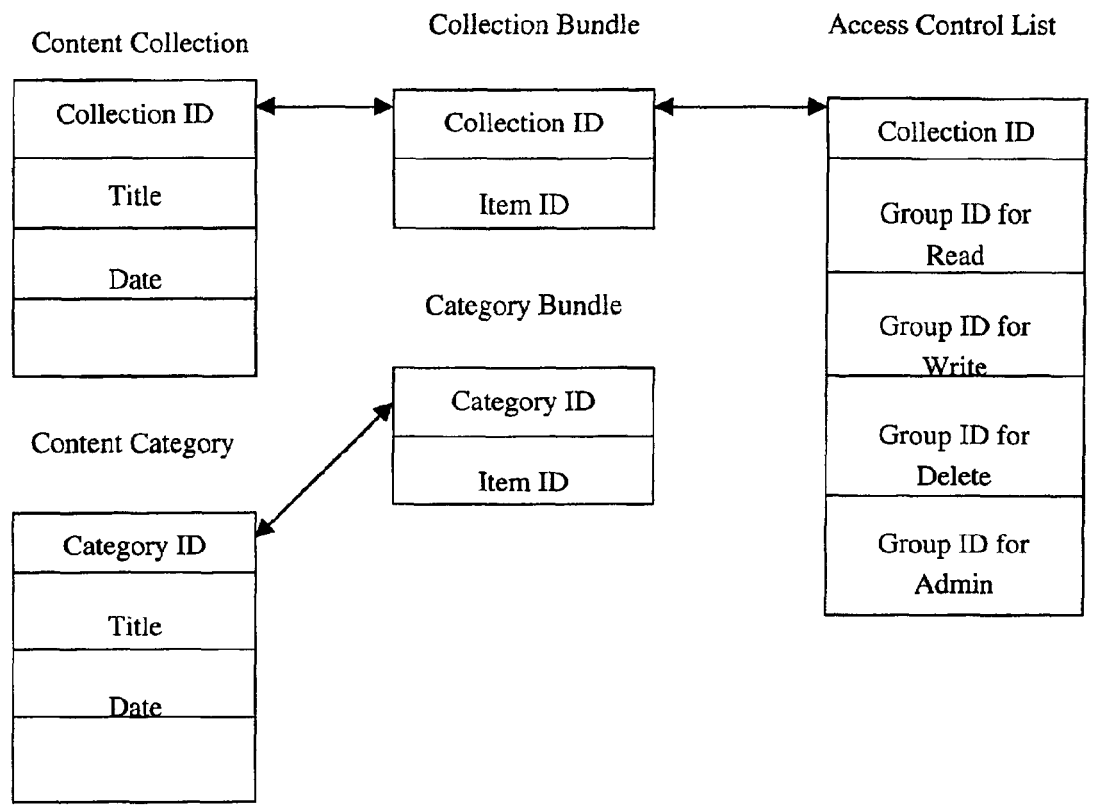
FIG. 4 illustrates the content data management and access control in accordance with one embodiment of the invention.

In order to implement techniques of the one embodiment of the invention, FIG. 4 illustrates the organization of data for content management system 176. It will be appreciated that there are a variety of other ways to organize data in content management system 176. Content collection includes a collection ID, title, date, and other information. Content collection is constructed based upon the physical location or an access control request for the content. The content collection defines the minimal access controllable set of contents, such as a set of content regarding a project or set of content located in a physical storage. A content item is placed in a content collection for access control. The smallest content collection contains only one content item. Content collections may be arranged in a variety of orders and are generally hierarchically ordered. A content item is typically only included in one of the lowest level of the collections. Additionally, a subcollection may be included in only one parent collection structure. Content category provides a logical group of similar contents by a given criteria that may be specified by a system administrator, business operator, a business manager, sales person or other suitable person. The criteria may also be extracted from the content itself. One content item may be in multiple subcategories in which each subcategory may be in multiple categories. The content item may be dynamically bundled into subcategories and categories which facilitates a category-driven content retrieval mechanism.

Figure 5:
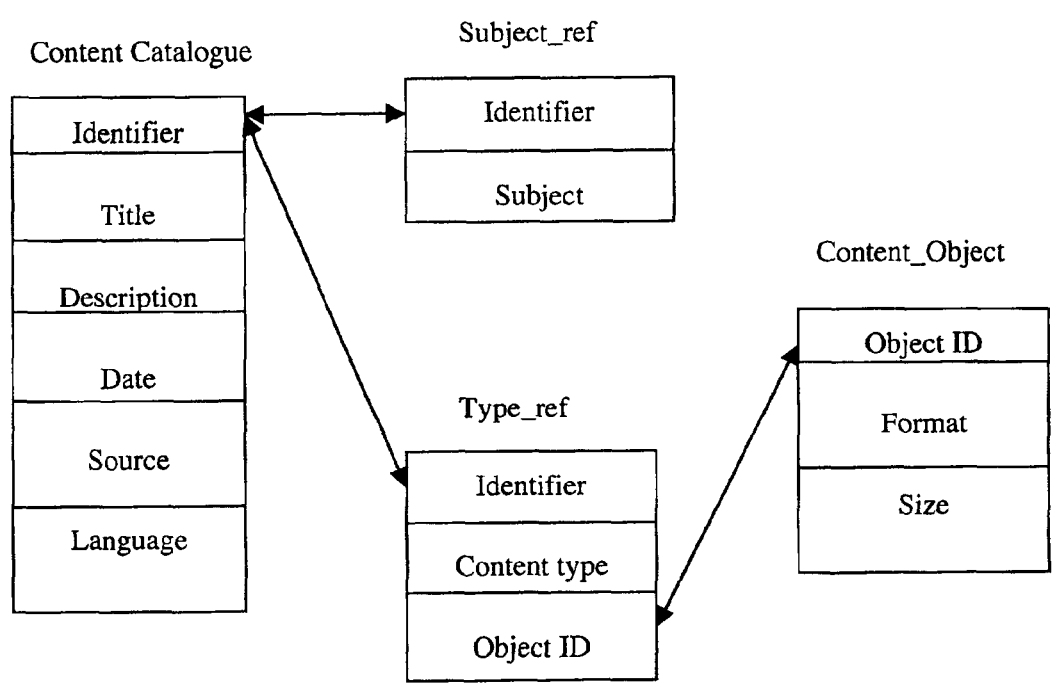
FIG. 5 illustrates the organization and the description of content data in the content management system in accordance with one embodiment of the invention.

FIG. 5 illustrates one content data organization schema that may be used in accordance with one embodiment of the invention. It will be appreciated that other suitable data schemes may be used. For example, content catalogue includes an identifier, title, description, date, source, and language. The content catalogue is defined and implemented by a group of database tables. The catalogue table includes the attributes for content items. The subject reference (or key words) and the type reference (the different content types for a different customer contact point) attributes are stored in separate tables so that each attribute may have multiple values and may be extended independently. Separate tables allow for a faster search by an individual value in each field.

Figure 6:
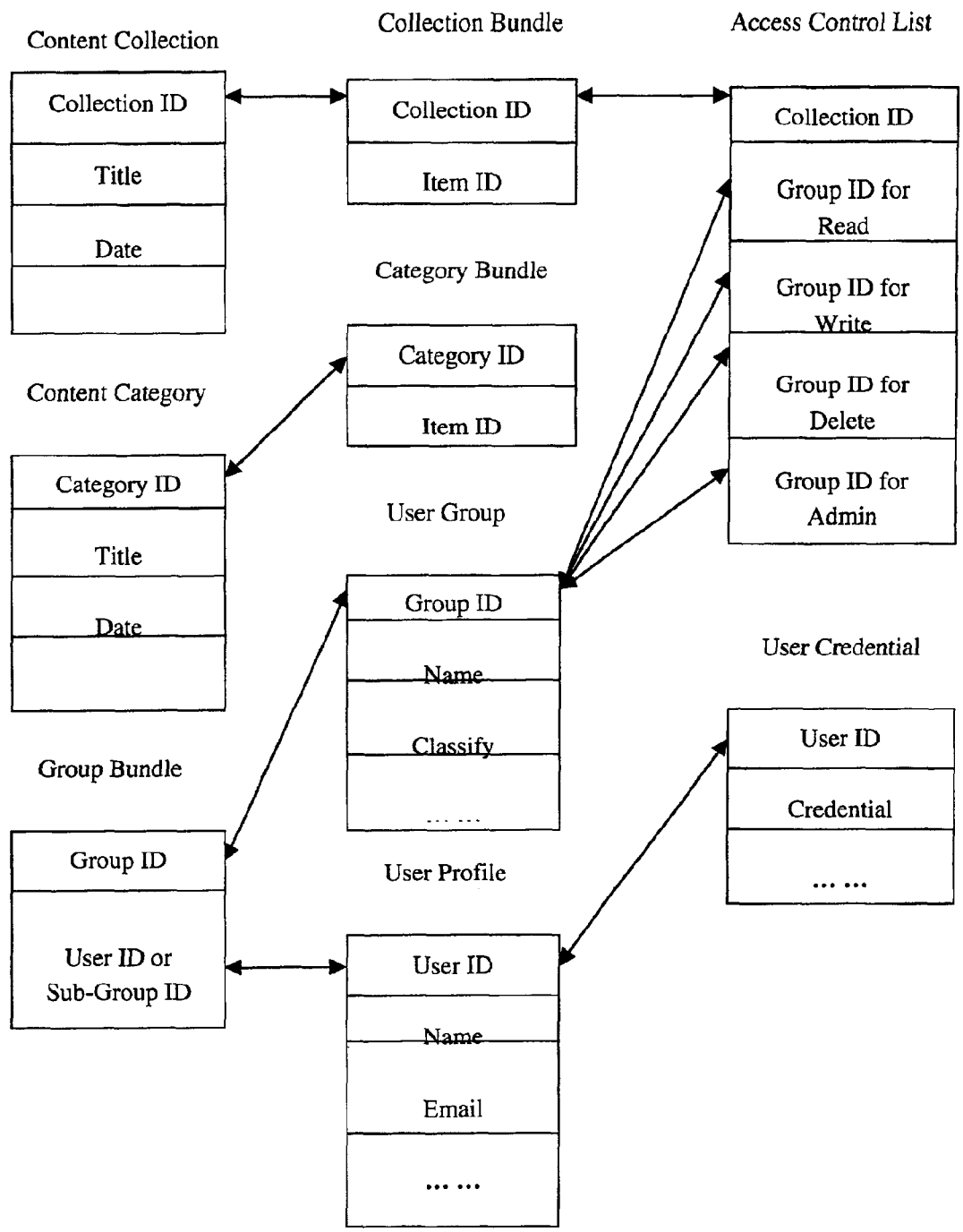
FIG. 6 illustrates a view of user management, content management, and content access control in accordance with one embodiment of the invention.

FIG. 6 illustrates an overall data schema in data repository 175 in accordance with one embodiment of the invention. It will be appreciated that other suitable data schemes may be used. Content management system 176 includes user targeting and access control components. Content items are targeted by user groups. User access control is applied based upon content collections. User access control is applied based on user groups. It will be appreciated that personalization subsystem 170 is extensible. Therefore, additional components may be added to personalization subsystem 170 to improve the personalized service offered to a customer.

Figure 7:
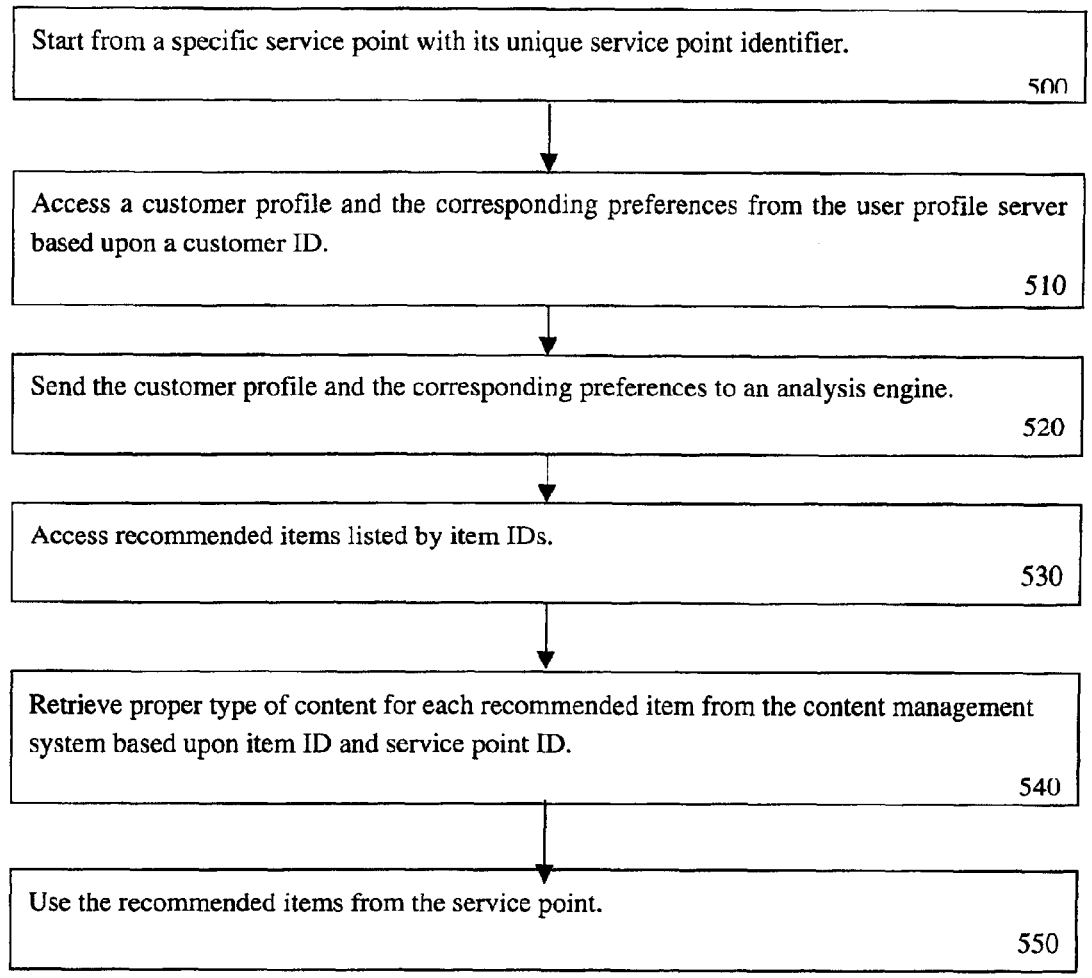
FIG. 7 illustrates a flow diagram for customer service recommendations for different service points in accordance with one embodiment of the invention.

FIG. 7 illustrates a flow diagram for customer service recommendations for different service points in accordance with one embodiment of the invention. At block 500, the operation starts from a specific service point such as a routing manager, an agent desktop server, an outbound campaign manager, or other service point using its unique service point identifier. At block 510, a customer profile and corresponding references are accessed from the user profile server based upon a customer's ID. At block 520, the customer profile and the corresponding preferences are sent to analysis engine 174. Analysis engine 174 generates at least one recommended item. At block 530, a recommended item or recommended items are accessed and listed by item IDs. At block 540, the proper type of content for each recommended item is retrieved by service points such as routing manager 182, agent desktop server 184, and outbound campaign manager 186 from the content management system based upon the item ID and the service point ID. At block 550, the recommended items are used by the service point. This means that the service point performs an action in response to a recommended item. For example, a recommended item to routing manager 182 may cause routing manager 182 to route a customer to a particular agent.

Figure 8:
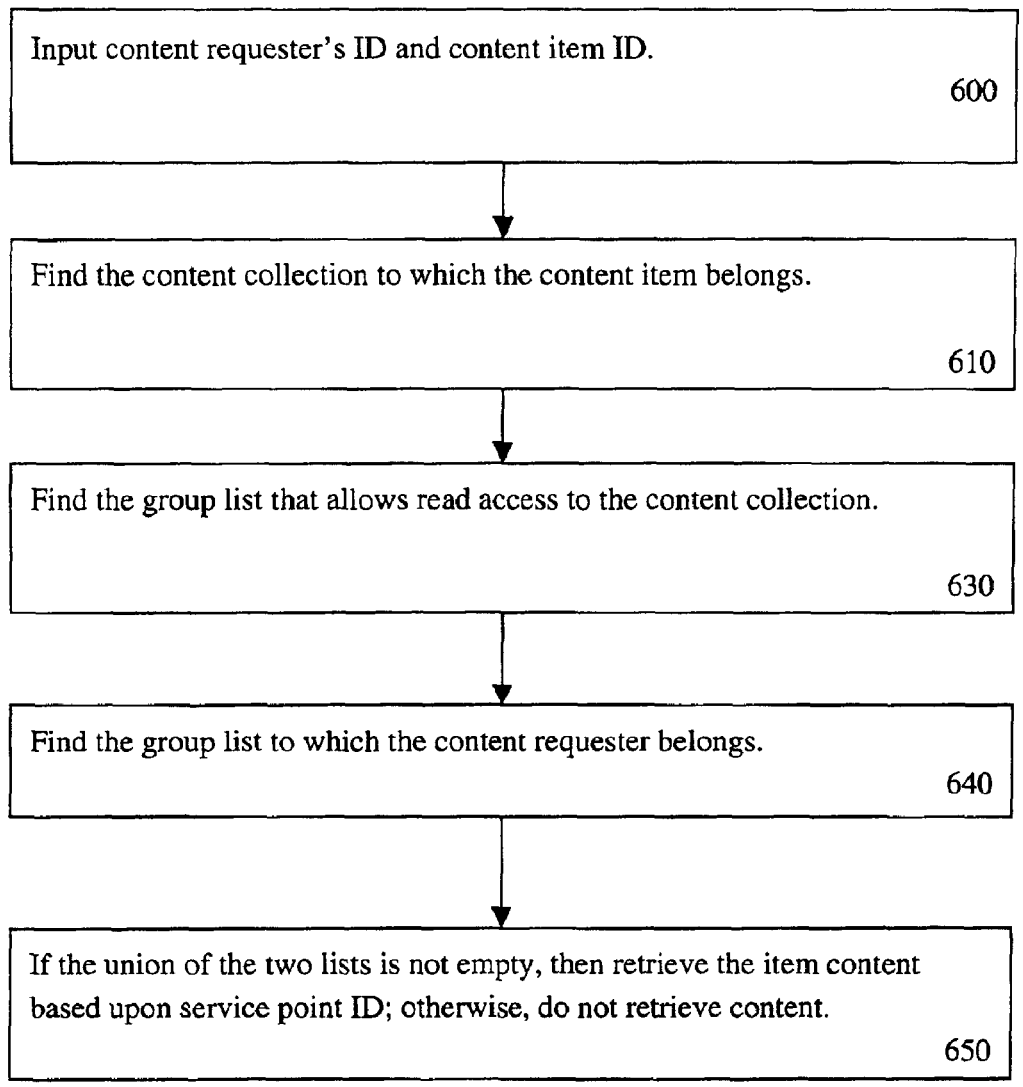
FIG. 8 illustrates a flow diagram for content retrieval inside the content management system with access control in accordance with one embodiment of the invention.

FIG. 8 illustrates a flow diagram for content retrieval inside the content management system 176 with access control in accordance with one embodiment of the invention. At block 600, a content requester's ID and content item ID are inputted by an application which obtains these IDs from previous steps or from the service content. At block 610, it is determined that the content item(s) belong to which content collection due to content access control. At block 630, the group list should be found such that the group in the group list allows read access to the content collection. At block 640, the group list to which the content requester belongs must be determined. At block 650, if the union of the two lists is not empty such as when the user has "read" access based upon the meaning of two lists, then the item content must be retrieved based upon the service point ID. Otherwise, the content is not retrieved.

Figure 9:
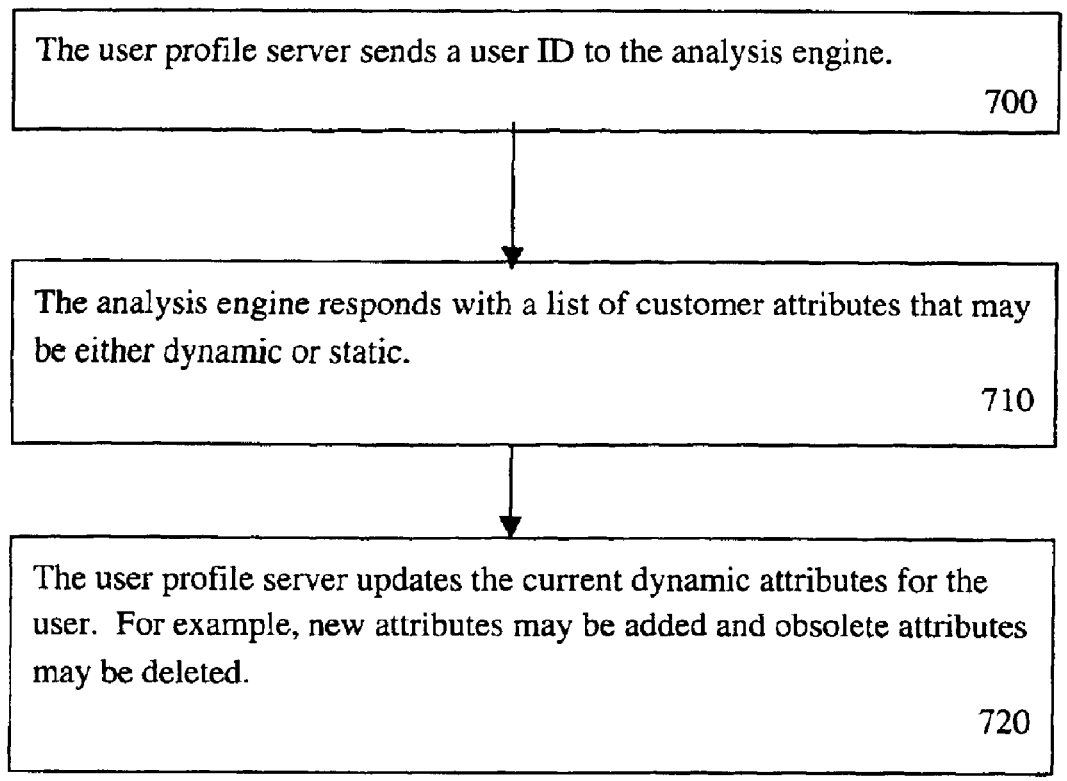
FIG. 9 illustrates a flow diagram in which customer dynamic attributes for the user profile are updated in real-time in accordance with one embodiment of the invention.

FIG. 9 illustrates a flow diagram in which customer dynamic attributes for the user profile are updated in real-time in accordance with one embodiment of the invention. At operation 700, the user profile server sends a user ID to the analysis engine. At block 710, the analysis engine responds with a list of customer attributes that may be either dynamic attributes or static attributes. At block 720, the user profile server updates the current dynamic attributes for the user. For example, new attributes may be added and obsolete attributes may be deleted.

Figure 10:
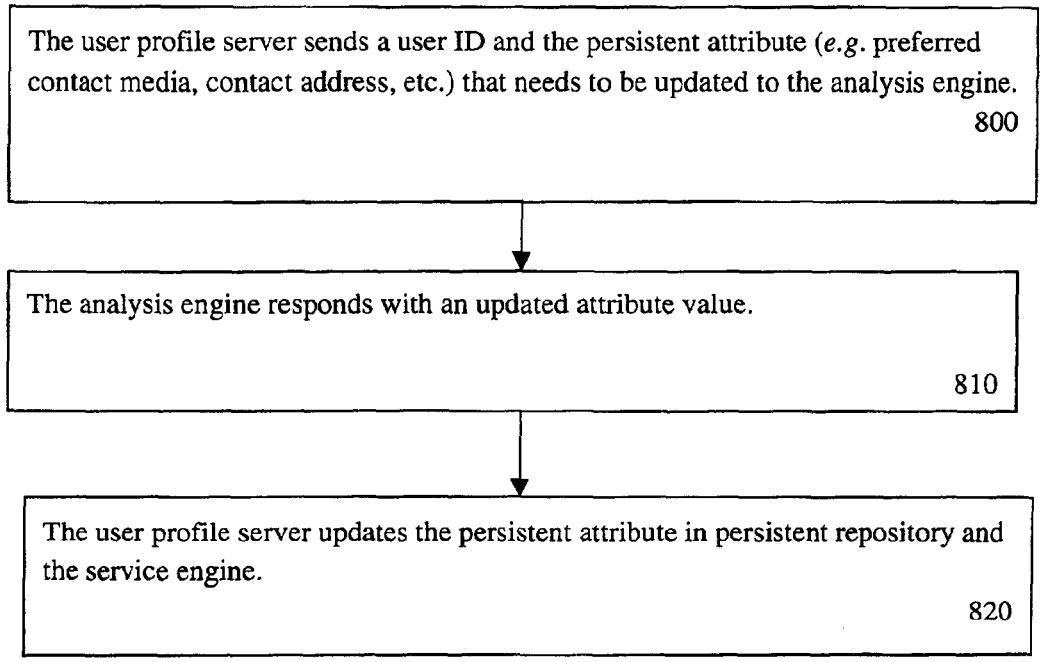
FIG. 10 illustrates a flow diagram in which persistent customer attributes are updated for the user profile server based upon service history analysis in accordance with one embodiment of the invention.

FIG. 10 illustrates a flow diagram in which persistent customer attributes are updated for the user profile server based upon service history analysis in accordance with one embodiment of the invention. Service history analysis relates to the goods or services purchased in past transactions. Service history may pertain to the particular service history of a particular customer or a group of customers.

At block 800, the user profile server sends a user ID and the persistent attribute (e.g., preferred contact media, contact address, etc.) that should be updated to the analysis engine. At operation 810, the analysis engine responds with an updated attribute value which is sent back to the user profile server. At block 820, the user profile server updates a persistent attribute in the data repository and in the run-time environment of the service engine.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A network system comprising:
   an analysis engine to interact with a user profile server, a user data collection point and a content management system, the analysis engine to perform an analysis in real-time to generate a recommendation that is associated with a recommended item, the recommendation to include a plurality of content types;
   the data collection point to provide data to the analysis engine;
   the user profile server to provide user data to the analysis engine;
   the content management system to manage the recommendation that is associated with the recommended item and includes the plurality of content types, wherein the plurality of content types includes at least a first content type and a second content type;
   a first service point to retrieve a first content type from the content management system, the first content type being included in the recommendation that is associated with the recommended item, the recommendation being personalized for a plurality of users, and the first content type being personalized for a first user; and
   a second service point to retrieve a second content type from the content management system, the second content type being included in the recommendation that is associated with the recommended item, the recommendation being personalized for the plurality of users, and the second content type being personalized for a second user.

2. The network system of claim 1, wherein the first service point may be utilized for an at least one of communicating a recommendation for a live agent to a live agent desktop, supporting a request to route data, supporting a request for a live agent assignment, and an providing an outbound campaign service.

3. The network system of claim 1, wherein the analysis engine is to collect data from a plurality of customer contact points.

4. The network system of claim 1, wherein the user profile server includes one of static profile attributes and dynamically generated attributes.

5. The network system of claim 4, wherein input from one of a first live agent and a second live agent updates one of the static profile attributes and the dynamically generated attributes.

6. The network system of claim 1, further comprising:
   a client request that is communicated to the analysis engine to trigger the analysis engine to perform the analysis in real-time to generate the recommendation.

7. The network system of claim 1, wherein the user profile server is coupled to a data repository for service data and metadata.

8. The network system of claim 1, wherein the user profile server, the analysis engine, and the content management system operate on at least one of a local and remote server.

9. A method comprising:
   receiving a customer profile, preferences and data wherein the customer profile, the preferences and the data are utilized to perform an analysis in real-time to generate a recommendation that is associated with a recommended item, the recommendation to include a plurality of content types;
   managing the plurality of content types for a plurality of service points, wherein the plurality of content types include at least a first content type and a second content type;
   retrieving the first content type by a first service point, the first content type being included in the recommendation that is associated with the recommended item, the recommendation being personalized for a plurality of users, and the first content type being personalized for a first user; and
   retrieving the second content type by a second service point, the second content type being included in the recommendation that is associated with the recommended item, the recommendation being personalized for the plurality of users, and the second content type being personalized for a second user.

10. The method of claim 9, further comprising:
    receiving data from a plurality of customer contact points.

11. The method of claim 9, wherein the customer profile is provided by a user profile server coupled to an analysis engine.

12. The method of claim 10, wherein the user profile server includes one of static user profile attributes and dynamically generated attributes.

13. The method of claim 12, further comprising:
    updating one of the static profile attribute and the dynamically generated attribute.

14. The method of claim 10, wherein the user profile, the analysis engine, and the content management system are operated on at least one of a local server and a remote server.

15. A machine readable storage media containing executable program instructions which when executed cause a digital processing system to:
    receive a customer profile, preferences and data wherein the customer profile, the preferences and the data are utilized to perform an analysis in real-time to generate a recommendation that is associated with a recommended item, the recommendation to include a plurality of content types;
    manage the plurality of content types for a plurality of service points, wherein the plurality of content types includes a first content type and a second content type;
    retrieve the first content type by the first service point, the first content type included in the recommendation that is associated with the recommended item, the recommendation being personalized for a plurality of users, and the first content type being personalized for a first user; and retrieve the second content type by the second service point, the first content type being included in the recommendation that is associated with the recommended item, the recommendation being personalized for the plurality of users, and the second content type being personalized for a second user.

16. The machine readable storage media of claim 15, wherein the method further comprises:

managing the plurality of content types for a plurality of service points.

17. The machine readable storage media of claim 15, wherein the method further comprises:

collecting data from a plurality of customer contact points.

18. The machine readable storage media of claim 16, wherein a user profile server is coupled to an analysis engine and a content management system, the content management system manages the plurality of content types.

19. The machine readable storage media of claim 18, wherein the user profile server includes one of static user profile attributes and dynamically generated attributes.

20. The machine readable storage media of claim 19, wherein the method further comprises:

updating one of the static profile attribute and the dynamically generated attribute.

21. The machine readable storage media of claim 19, wherein the user profile server, the analysis engine, and the content management system are operated on at least one of a local server and remote server.

22. The method of claim 1, wherein multiple content types may be retrieved by a single user.

23. The method of claim 1, wherein the first content type includes content for live agent assistance and the second content type includes content for customer self-service.

24. The method of claim 1, wherein the content management system includes a plurality of content collections.

25. The method of claim 24, wherein the content management system utilizes the plurality of content collections to control access to the plurality of content types.

26. A network system comprising:

a first means for interacting with a second means, a third means and a fourth means, the first means for performing an analysis in real-time to generate a recommendation that is associated with a recommended item, the recommendation to include a plurality of content types;

the third means for providing data to the analysis engine;

the second means for providing user data to the analysis engine;

the fourth means for managing the recommendation that is associated with the recommended item and includes the plurality of content types, wherein the plurality of content types includes at least a first content type and a second content type;

a fifth means for retrieving a first content type from the fourth means, the first content type being included in the recommendation that is associated with the recommended item, the recommendation being personalized for a plurality of users, and the first content type being personalized for a first user; and a sixth means for retrieving a second content type from the fourth means, the second content type being included in the recommendation that is associated with the recommended item, the recommendation being personalized for the plurality of users, and the second content type being personalized for a second user.

* * * * *